United States Patent
Pritschins et al.

(10) Patent No.: US 11,945,940 B2
(45) Date of Patent: Apr. 2, 2024

(54) FILLED POLYVINYL CHLORIDE COMPOSITION

(71) Applicant: BYK—Chemie GmbH, Wesel (DE)

(72) Inventors: Wolfgang Pritschins, Wesel (DE); Daniel Leibig, Wesel (DE); Martin Fischer, Wesel (DE); Thomas Fritsch, Wesel (DE); Jennifer Heitzer, Wesel (DE); Dennis Krüsmann, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 790 days.

(21) Appl. No.: 17/049,064

(22) PCT Filed: Apr. 18, 2019

(86) PCT No.: PCT/EP2019/060174
§ 371 (c)(1),
(2) Date: Oct. 20, 2020

(87) PCT Pub. No.: WO2019/206823
PCT Pub. Date: Oct. 31, 2019

(65) Prior Publication Data
US 2021/0253840 A1    Aug. 19, 2021

(30) Foreign Application Priority Data
Apr. 23, 2018   (EP) .................................... 18168663

(51) Int. Cl.
| | |
|---|---|
| *C08L 27/06* | (2006.01) |
| *C08K 3/26* | (2006.01) |
| *C08K 5/12* | (2006.01) |
| *C08L 71/02* | (2006.01) |
| *E04C 2/20* | (2006.01) |

(52) U.S. Cl.
CPC ................ *C08L 27/06* (2013.01); *C08K 3/26* (2013.01); *C08K 5/12* (2013.01); *C08L 71/02* (2013.01); *C08K 2003/265* (2013.01); *E04C 2/20* (2013.01)

(58) Field of Classification Search
CPC .......... C08L 27/06; C08L 71/02; C08K 3/26; C08K 5/12
USPC ........................................................... 524/527
See application file for complete search history.

(56) References Cited

U.S. PATENT DOCUMENTS

| | | | |
|---|---|---|---|
| 7,205,351 | B2 | 4/2007 | Pritschins et al. |
| 9,587,100 | B2 | 3/2017 | Lavallee et al. |
| 2009/0111915 | A1 | 4/2009 | Lavallee et al. |

FOREIGN PATENT DOCUMENTS

| | | | | |
|---|---|---|---|---|
| CN | 107057236 A | 8/2017 | | |
| EP | 1304210 A1 | 4/2003 | | |
| WO | 2008071800 A2 | 6/2008 | | |
| WO | WO-2008071800 A2 * | 6/2008 | ............... | C08K 3/00 |
| WO | 2011029711 A1 | 3/2011 | | |
| WO | 2011041195 A1 | 4/2011 | | |

OTHER PUBLICATIONS

International Search Report and Written Opinion for PCT Application No. PCT/EP2019/060174 dated Jul. 19, 2019 (9 pages).

* cited by examiner

*Primary Examiner* — Deve V Hall
(74) *Attorney, Agent, or Firm* — Fitch, Even, Tabin & Flannery LLP

(57) ABSTRACT

A composition is provided comprising: a) polyvinylchloride, b) inorganic solid particles, and c) a polymer having a polyether segment, wherein at least 60 mol-% of the end groups of the polymer are selected from the group consisting of carboxylic acid groups and hydroxyl groups, and wherein at least a part of the end groups of the polymer is a carboxylic acid group, wherein the carboxylic acid end groups are linked to the polyether segment via a linking segment comprising an ester group.

15 Claims, No Drawings

FILLED POLYVINYL CHLORIDE COMPOSITION

FIELD OF THE INVENTION

The invention relates to a composition comprising polyvinyl chloride and inorganic solid particles. The invention further relates to a process of preparing a filled polyvinyl chloride material. The invention further relates to use of a polymer according to the present invention for improving the mechanical properties of polyvinyl chloride filled with inorganic solid particles. The invention further relates to a composition comprising inorganic solid particles and a polymer according to the present invention. The invention further relates to a floor tile comprising the composition according to the present invention.

BACKGROUND OF THE INVENTION

Filled polyvinyl chloride (PVC) is commonly used in forming PVC floor tiles and rolled flooring using relatively high levels of inorganic solid particles as a filler, often in an amount of at least 50% by weight. Higher levels of inorganic solid particles as a filler are also used in PVC composites used in pipe and siding, window, cable and door components, fencing and other architectural components—though the levels of filler may be lower than in the flooring applications. A high level of filler is used to reduce costs, and a minimal amount of polyvinyl chloride is used to hold the filler together. The processing of a highly filled thermoplastic polyvinyl chloride composition can be difficult, and may even require expensive vinyl copolymers, such as a polyvinyl alcohol (PVA)/PVC copolymer.

EP 1304210 describes condensation products of dimer fatty acids and mono-alcohols, such as in an example a monoalcohol of a polyether, which are used as additive for processing filled plastic compounds. When further increasing a concentration level of filler in a PVC blend, the dimer fatty acid derived processing additives do not provide a suitable plastification behavior or processing of said filled PVC.

US 2009/0111915, describes butyl acrylate/methyl methacrylate copolymers as processing additive for a filled PVC blend. When further increasing a concentration level of filler in PVC, the use of the copolymers as processing additives do not enhance a suitable plastification behavior or processing of said filled PVC.

There is an ongoing need for compositions of polyvinyl chloride and a filler in the form of inorganic solid particles that alleviate the above-mentioned problems. Particular embodiments of the present invention aim at providing a process of preparing a filled polyvinyl chloride material wherein a preparation time of the composition is reduced while a dispersion quality of the filler inside the polyvinyl chloride is enhanced. Particular embodiments of the present invention aim at providing polyvinyl chlorides filled with inorganic solid particles having improved mechanical properties.

SUMMARY OF THE INVENTION

The invention provides a composition comprising: polyvinylchloride, inorganic solid particles, and a polymer having a polyether segment, wherein at least 60 mol-% of the end groups of the polymer are selected from the group consisting of carboxylic acid groups and hydroxyl groups, and wherein at least a part of the end groups of the polymer is a carboxylic acid group, wherein the carboxylic acid end groups are linked to the polyether segment via a linking segment comprising an ester group.

In a second aspect of the present invention, a process is provided of preparing a filled polyvinyl chloride material, comprising the steps of:
  i) providing
    a) polyvinylchloride,
    b) inorganic solid particles,
    c) a polymer having a polyether segment, wherein at least 60 mol-% of the end groups of the polymer are selected from the group consisting of carboxylic acid groups and hydroxyl groups, and wherein at least a part of the end groups of the polymer is a carboxylic acid group, wherein the carboxylic acid end groups are linked to the polyether segment via a linking segment comprising an ester group and
    d) optionally providing further components,
  ii) mixing the provided components in any suitable order, and
  iii) subjecting the components a), b) and c), optionally including component d), to shear force in a temperature range of 80 to 200° C.

In a third aspect of the present invention, a use is provided of a polymer having a polyether segment, wherein at least 60 mol-% of the end groups of the polymer are selected from the group consisting of carboxylic acid groups and hydroxyl groups, and wherein at least a part of the end groups of the polymer is a carboxylic acid group, wherein the carboxylic acid end groups are linked to the polyether segment via a linking segment comprising an ester group for improving the mechanical properties of polyvinylchloride filled with inorganic solid particles.

In another aspect of the present invention, a composition is provided comprising inorganic solid particles and a polymer having a polyether segment, wherein at least 60 mol-% of the end groups of the polymer are selected from the group consisting of carboxylic acid groups and hydroxyl groups, wherein at least a part of the end groups of the polymer is a carboxylic acid group, wherein the carboxylic acid end groups are linked to the polyether segment via a linking segment comprising an ester group and wherein the polymer is present in an amount of 0.1 to 5.0% by weight, wherein the % by weight is calculated on the weight of the inorganic solid particles.

It has been found that a polymer (component c) according to the present invention when used as additive in a filled PVC blend, which contains inorganic solid particles, enhances the mixing behavior and processing of the PVC blend. In particular, it has been found that a plastification behavior of the filled PVC blend is improved and that a mixing time needed to properly mix the filled PVC blend is shortened. Additionally, it has been found that mechanical properties, especially an elongation at break, of the resulting filled PVC blend is improved. In this way, a filled PVC blend can be obtained having a larger amount of inorganic solid particles. The larger amount of inorganic solid particles in the PVC blend may be used to reduce costs of the PVC blend.

The inorganic solid particles according to the present invention are particles, which are solid at room temperature and are solid at processing temperatures to prepare the PVC blend. In embodiments, the inorganic solid particles may additionally comprise organic components. In embodiments, the inorganic solid particles may be used as a filler of the PVC blend. For example, the inorganic solid particles may be used to replace a portion of the polyvinylchloride resin in the PVC blend.

Additionally or alternatively, the inorganic solid particles may be selected to provide additional functions to the PVC blend and/or to modify its properties, such as optical properties (e.g. using pigments), electrical properties, chemical properties and other properties of the PVC blend.

The polymer (component c) is preferably provided in an amount of 0.1 to 5.0% by weight, wherein the % by weight is calculated on the weight of the inorganic solid particles. More preferably, the polymer is preferably provided in an amount of 0.1 to 3.5% by weight, even more preferably the polymer is provided in an amount of 0.1 to 2.5% by weight, wherein the % by weight is calculated on the weight of the inorganic solid particles.

It has been found that depending on the type of inorganic solid particles and/or the particle size of the inorganic solid particles the amount of polymer may have a certain optimum concentration range for enhancing the plastification behavior of the filled PVC blend.

In a preferred embodiment, the polymer (c) having a polyether segment has a polyether polymer main chain. In another embodiment, the polyether segment is the polymer main chain.

In embodiments, a polyvinylchloride may comprise a polyvinylchloride (PVC) resin, may comprise a chlorinated polyvinylchloride (CPVC) resin and combinations thereof. In alternative embodiments, the polyvinylchloride may comprise any other substituted polyvinylchloride resin.

The PVC or CPVC is present in the composition at a level of from 0.1 to 95 weight percent, depending on the end use of the filled PVC composition.

In a preferred embodiment, the polyvinylchloride (PVC) resin is prepared by suspension polymerization.

The inorganic solid particles may be any suitable inorganic particle for mixing with polyvinylchloride. In exemplary embodiments, the inorganic solid particles is selected from the group consisting of calcium carbonate, limestone, aluminum trihydrate, quartz, silica and mixtures thereof. Further examples of suitable materials to be used as inorganic particles include sulfates, for example sodium, magnesium- or calcium sulfate, silicates, clay, carbonates, oxides and hydroxides of metals, as well as glass particles, including glass fibers.

The mean particle size of the inorganic solid particles may be in the range of 1 to 100 microns. In a preferred embodiment, the mean particle size of the inorganic solid particles is in the range of 1 to 50 microns.

In exemplary embodiments, a masterbatch composition is provided comprising at least 80% by weight of at least one type of inorganic solid particles, preferably at least 90% by weight of at least one type of inorganic solid particles, and 0.1 to 10.0% by weight of the polymer according to the present invention, wherein the % by weight is calculated on the weight of the masterbatch composition. The advantage of said masterbatch composition is that the masterbatch composition may be prepared prior to mixing the masterbatch composition with a polyvinylchloride.

Preferably, the masterbatch composition comprises at least 90% by weight of the at least one type of inorganic solid particles, more preferably at least 95% by weight of the at least one type of inorganic solid particles, and 0.1 to 5.0% by weight of the polymer according to the present invention, wherein the % by weight is calculated on the weight of the masterbatch composition. In particular embodiments, the masterbatch composition consists essentially of the at least one type of inorganic solid particles and at least one polymer according to the present invention.

In an exemplary embodiment, the polymer has on average at least 1.0 carboxylic acid end groups per molecule.

In a preferred embodiment, the polymer has carboxylic acid end groups in a range of 1.0-1.5 on average per molecule, more preferably the polymer has carboxylic acid end groups in a range of 1.1-1.3 on average per molecule.

In a particular embodiment, the polymer has on average at least 0.5 hydroxyl end groups per molecule. The at least 0.5 hydroxyl end groups per molecule may enhance a wetting behavior of the polymer to an outer surface of a particle of inorganic solid particles, such as a filler. Said wetting behavior of the polymer supports a proper plastification behavior or processing of a filled PVC having said polymer. Additionally, said wetting behavior of the polymer supports a proper preparation process of a masterbatch composition of a mixture of at least one type of inorganic solid particles and at least one polymer according to the present invention.

In an exemplary embodiment, the polymer has at least 2 endgroups and at most 3 endgroups and has on average at least 1.0 carboxylic acid end groups per molecule. Said polymer may be selected from the group consisting of a linear catenated polymer, a polymer comprising a star shape having three arms and a polymer having a main chain and one branched polymer segment. Said polymer having a star shape may be formed by a central linking segment and three arms connected to the central linking segment. In examples, the central linking segment may be provided by a tri-functional component, preferably a tri-hydroxyl component, such as a glycerol component, a trimethylolpropane component and a triethanolamine component. In embodiments, each of said three arms may comprise a polyether segment.

In a particular exemplary embodiment, the polymer is a catenated polymer having 2 endgroups, wherein the polymer has carboxylic acid end groups in a range of 1.0-2.0 on average per molecule. In a particular embodiment, said catenated polymer may be substantially completely provided by one polyether segment. Alternatively, said catenated polymer may comprise at least two polyether segments, which are coupled to each other by a bifunctional linking segment. Additionaly or alternatively, said catenated polymer may be a copolymer comprising the polyether segment and at least one other polymer segment. Said other polymer segment may be any polymer segment, such as a polyester segment, a polyurethane segment and a polyamide segment. Said copolymer may be a block copolymer and may be a random copolymer.

In a preferred embodiment, the catenated polymer has carboxylic acid end groups in a range of 1.0-1.5 on average per molecule, more preferably the polymer has carboxylic acid end groups in a range of 1.1-1.3 on average per molecule. It has been found that at a number of carboxylic acid end groups being at the most of 1.5 on average per molecule enhances a plastification process of the filled PVC blend. Additionally, the maximum amount of carboxylic acid end groups, which is at the most of 1.5 on average per molecule, may prevent or at least reduce a crosslinking by the polymer of the inorganic solid particles to one another in the filled PVC composition.

The carboxylic acid end groups are linked to the polyether segment via a linking segment comprising an ester group. Said linking segment, which has a linking ester group, may be easily formed by a condensation or addition reaction using a dicarboxylic acid or a cyclic acid anhydride.

In an exemplary embodiment, the linking segment comprises a hydrocarbyl group located between the ester group and the carboxylic acid group, wherein the ester group and the carboxylic acid group are separated by at most 6 carbon atoms. The at most 6 carbon atoms between the ester group and the carboxylic acid group may be part of at least one of a linear, saturated, halogenated or non-halogenated alkyl group with 1 to 6 carbon atoms, a branched, saturated, halogenated or non-halogenated alkyl group, an aryl group, an alkylaryl group or arylalkyl group, an alkoxyalkyleneoxide residue or an alkoxypolyalkyleneoxide residue, wherein the alkylene unit is in each case preferably a $C_2$-$C_4$, more preferably an $O_2$— and/or $C_3$— alkylene unit.

In particular embodiments, the linking segment may comprise more than said at most 6 carbon atoms. For example any one of a branched alkyl group, an arylgroup, and an arylalkyl group may comprise additional carbon atoms additional to the 6 carbon atoms, which separate the ester group from the carboxylic acid group.

In a particular embodiment, the linking segment is formed by a ring opening addition reaction of a cyclic acid anhydride and a polyether segment having at least one hydroxyl end group per molecule, preferably a polyether segment having at least 2 hydroxyl end groups per molecule, more preferably a polyether segment having 2 hydroxyl end groups per molecule. The resulting linking segment comprises an ester group and a hydrocarbyl group located between the ester group and the carboxylic acid group. A carboxylic acid end group is provided by the ring opening addition reaction of the anhydride. Said cyclic acid anhydride may be selected from the group consisting of maleic anhydride, itaconic anhydride, citraconic anhydride, succinic anhydride, substituted succinic anhydride, such as alkyl succinic anhydride or alkenyl succinic anhydride, phtalic anhydride, glutaric anhydride and trimellitic anhydride. An advantage of using a cyclic acid anhydride is a desired number of the carboxylic acid end groups may easily be obtained due to a high selectivity of the addition reaction. Another advantage is that the average molecular weight and/or the polydispersity D of the resulting polymer is substantially unchanged compared to the pre-polymer or polyether segment having the hydroxyl end groups. Another advantage is that no water is formed due to the addition reaction of the cyclic acid anhydride and the polyether segment having hydroxyl end groups.

In an exemplary embodiment, the polyether segment comprises polyalkylene oxide units.

Polyether segments based on polyalkylene oxide units are commercially commonly available. Examples of polyalkylene oxide units are polyethylene oxide units, polypropylene oxide units and polybutylene oxide units. In exemplary embodiments, the polyether segment comprises at least one polyalkylene oxide unit selected from the group consisting of polyethylene oxide units, polypropylene oxide units and polybutylene oxide units.

In particular embodiments, the polyether segment comprises at least two polyalkylene oxide blocks, a first polyalkylene oxide block being different from a second polyalkylene oxide block, wherein each polyalkylene oxide block comprises one polyalkylene oxide unit selected from the group consisting of polyethylene oxide units (PEO), polypropylene oxide units (PPO) and polybutylene oxide units (PBO). Preferably, polyether segment comprises three polyalkylene oxide blocks, wherein a second polyalkylene oxide block, which is arranged between a first polyalkylene oxide block and a third polyalkylene oxide block, is different from said first polyalkylene oxide block, and wherein the third polyalkylene oxide block is equal to the first polyalkylene oxide block. In an example, said polyether segment is a PEO/PPO/PEO triblock copolymer. An example of a PEO/PPO/PEO triblock copolymer is Pluronic P-123 supplied by BASF.

In particular embodiments, the polyether segment comprises at least two polyalkylene oxide units, which at least two polyalkylene oxide units are arranged in a random order along the polyether segment. Said polyether segment is a statistical copolymer of said at least two polyalkylene oxide units.

In a preferred embodiment, the polyether segment comprises at most 20 mol-% polyethylene oxide units, based on the polyether segment. In another preferred embodiment the polymer (c) comprises at most 20 mol-% polyethylene oxide units.

In particular embodiments, the polymer has a star shape being constituted by a central linking segment and three arms connected to the central linking segment, wherein each arm comprises a polyether segment. Said star shaped polymer may be formed by reacting a cyclic anhydride with a star shaped pre-polymer having a central linking segment and three arms connected to the central linking segment, wherein each arm comprises a polyether segment and a hydroxyl end group. In an example, such a star shaped pre-polymer having three hydroxyl end groups per molecule is a triol polyether polyol VORANOL obtainable from Dow.

In an exemplary embodiment, the polyether segment comprises repeating units of the formula —[O—$(CH_2)_4$]—. Said polyether segment may be a polytetrahydrofuran polyether segment. Said polytetrahydrofuran polyether may easily be formed by an acid-catalyzed polymerization of tetrahydrofuran. Said polyether segment may comprise additional repeating units, such as at least one polyalkylene oxide unit.

In an exemplary embodiment, the polyether segment comprises a polyether carbonate unit. In examples, the polyether carbonate unit is prepared from one or more alkylene oxides, carbon dioxide and optionally from two or more OH-functional starter substances. An example of a polymer having a polyether carbonate unit is CARDYON obtainable from Covestro.

In an exemplary embodiment, the polymer having a polyether segment has 2 to 6 end groups. In an example, the polymer has a comb-like structure having a main polymer chain and a number of polyether segments, which polyether segments are grafted to the main polymer chain as side chains, wherein the polymer in total has 3 to 6 end groups. For example, the main polymer chain may be prepared from polymerizing an allyl alcohol monomer and optional another allyl monomer. In a grafting step, a number of polyether segments may be linked or grafted to hydroxyl groups of the main polymer chain formed by the allyl alcohol and the optional other allyl monomer.

In an exemplary embodiment, the number average molecular weight Mn of the polymer having a polyether segment is in the range of 700 to 6000 g/mol. In a preferred embodiment, the number average molecular weight Mn of the polymer having a polyether segment is in the range of 1000-5000 g/mol, more preferably in the range of 1250-4000 g/mol.

The number average molecular weight can suitably be determined by gel permeation chromatography, using polystyrene as calibration standard and THF as eluent.

In an exemplary embodiment, the amount of inorganic solid particles in the composition is in the range of 20 to 90% by weight, calculated on the weight of the composition. In a preferred embodiment, the amount of inorganic solid particles in the composition is in the range of 40 to 80% by weight, calculated on the weight of the composition. In a more preferred embodiment, the amount of inorganic solid particles in the composition is in the range of 50 to 80% by weight, calculated on the weight of the composition.

In an exemplary embodiment, the composition further comprises a plasticizer. Said plasticizer may be any suitable plasticizer as known in the art of plasticizing a PVC blend.

In an exemplary embodiment, the composition further comprising an acrylic copolymer comprising methyl methacrylate units and at least one other acrylic monomer.

The addition of the acrylic copolymer may enhance the melt strength of the composition.

In an exemplary embodiment, the composition comprises
a) 7 to 60% by weight of polyvinylchloride,
b) 20 to 90% by weight of inorganic solid particles,
c) 0.1 to 5.0% by weight of said polymer having a polyether segment, wherein at least 60 mol-% of the end groups of the polymer are selected from the group consisting of carboxylic acid groups and hydroxyl groups, and wherein at least a part of the end groups of the polymer is a carboxylic acid group, wherein the carboxylic acid end groups are linked to the polyether segment via a linking segment comprising an ester group
d) 0 to 30% by weight one or more plasticizers, and
e) 0 to 5% by weight of other additives which are different from components a) to d), wherein the % by weight are calculated on the total weight of the composition.

The polymer (component c) is preferably provided in an amount of 0.1 to 5.0% by weight, wherein the % by weight is calculated on the total weight of the components. More preferably, the polymer is preferably provided in an amount of 0.1 to 3.5% by weight, even more preferably the polymer is provided in an amount of 0.1 to 2.5% by weight, wherein the % by weight is calculated on the total weight of the components.

The inorganic solid particles (component b) is preferably provided in an amount of 30 to 90% by weight, wherein the % by weight is calculated on the total weight of the components. More preferably, the inorganic solid particles is preferably provided in an amount of 40 to 80% by weight, even more preferably the inorganic solid particles is provided in an amount of 50 to 70% by weight, wherein the % by weight is calculated on the total weight of the components.

In another aspect of the present invention, a floor tile is provided comprising the composition according to the present invention.

By flooring application of a floor tile as used herein is encompassed both hard and soft vinyl flooring, including rolled flooring, flooring tiles, and other types of PVC-based flooring.

DETAILED DESCRIPTION

Application Ranges

In a flooring application the level of PVC is preferably in the range of from 1 to 50 weight percent, more preferably from 4 to 40 weight percent. By "flooring" as used herein is encompassed both hard and soft vinyl flooring, including rolled flooring, flooring tiles, and other types of PVC-based flooring.

In a siding application the level of PVC is in the range of from 71 to 93 weight percent. "Siding" as used herein includes, but is not limited to, PVC or CPVC vinyl siding, fascia, drain pipe, guttering, window and door frames, fencing, decking, and other application designed to be exposed to the environment.

In a pipe application, the level of PVC or CPVC is in the range of from 50 to 95 weight percent, and more preferably 71 to 93 weight percent. By PVC or CPVC piping is meant pipe and fittings used to transport fluids, including for hot and cold potable water, waste water, chemicals, gases and other fluid-transport operations.

"Highly filled" polyvinyl chloride composites is a term dependent on the end use of the highly filled composite. For flooring applications, the level of filler is at least 40 weight percent, and preferably at least 50 percent, and more preferably at least 60 weight percent. In a PVC or CPVC pipe or siding application, a high level of filler would be greater than 15 weight percent, and more preferably greater than 20 weight percent, and even up to 35 weight percent.

The mean particle size of the filler selected may be that typically used in the corresponding end-use application. In general, the mean filler particle size for siding is in the range of 0.7 to 1.5 microns, for pipe is in the range of 1 to 3 microns, and for flooring is in the range of 1 to 100 microns.

Calandering Compositions

Thermoplastics which have a distinct plastic region with high melt viscosity (about $10^2$-$10^3$ Pa·s) can be processed by calandering. Examples of processes for this purpose are described in Polymere Werkstoffe—Band III, Technologie 2 [Polymeric materials, Volume III, Technology 2], by Hans Batzer, Georg Thieme Verlag, Stuttgart, 1984 edition, pp. 251 et seq. Examples of products produced in this way include floor coverings, films with a very wide variety of uses made from unplasticized, semirigid, plasticized PVC and the like.

In order to prevent the melt from adhering to the metal surfaces, internal lubricants are often added, e.g., fatty alcohol esters of long-chain fatty acids ($C_{14}$-$C_{18}$). The lubricants improve melt flow by reducing the friction between the PVC particles. External lubricants, e.g. paraffins and waxes, are also added in order to ease separation of the calandering composition from the rolls. Downstream of the calander there is often printing machinery or embossing calanders (e.g., to produce decorative films, upholstery films or synthetic-leather films from plasticized PVC).

Injection-Moulding Compositions

Moulding compositions made from thermoplastic synthetic polymers are usually referred to as injection-moulding compositions. The moulding compositions are composed of a polymeric base material and of additives, e.g., fillers or reinforcing materials. Injection-moulding compositions often use polymers with lower molar masses than those used in extrusion compositions. Therefore, they have more favourable melt viscosity and flowability. However, when additives are used, e.g., flow promoters and lubricants, the action of these materials always has to be taken into account. For example, any reduction in the relative molar mass of the polymer impairs mechanical properties. In addition, lubricant additives can also lower the softening point.

Further detailed descriptions of additives in injection-moulding compositions, and the processing and composition of these, are found in Polymere Werkstoffe—Band III, Technologie 2 [Polymeric materials, Volume III, Technology 2], by Hans Batzer, Georg Thieme Verlag, Stuttgart, 1984 edition, pp. 204-221.

Extrusion Compositions

Extrusion compositions often use polymers with higher molar masses than those used for injection-moulding compositions, e.g., with higher melt viscosity and lower flowability. The higher melt viscosity of the extrusion compositions improves strength between discharge from the die and the calibrator. The higher relative molar mass and therefore higher melt viscosity is also associated with better mechanical properties, but with greater difficulty in processing by injection moulding. A detailed description is found in Polymere Werkstoffe—Band III, Technologie 2 [Polymeric materials, Volume III, Technology 2], by Hans Batzer, Georg Thieme Verlag, Stuttgart, 1984 edition, pp. 244 et seq.

Coating Compositions

According to DIN 8580, coating is a manufacturing process for applying an adherent layer made from a shapeless substance to a workpiece or substrate web.

The coating compositions usually are thermoplastics or—to a small extent—elastomers. Among the thermoplastics, PVC pastes are the most common. Among PVC pastes, a distinction is made between plastisols, which are more commonly used, and organosols. Coating compositions are prepared by stirring pulverulent PVC paste grades (usually based on emulsion PVC, and occasionally on suspension PVC) and additives (stabilizers), pigments and fillers into plasticizers, by mixing or dispersion in appropriate mixing apparatus.

A detailed description of the preparation process is found in Polymere Werkstoffe—Band III, Technologie 2 [Polymeric materials, Volume III, Technology 2], by Hans Batzer, Georg Thieme Verlag, Stuttgart, 1984 edition, pp. 254 et seq.

The floor coverings and synthetic leather coatings produced are often further processed with an additional surface treatment, e.g., embossing of a particular design, with the aid of embossing rolls, and/or surface-coating by planography or gravure printing.

Thermosets (Moulding Compounds)

Moulding compounds generally include the following components:

reactive resins, curing agents, optionaly accelerators (this mixture often also being termed binder matrix) fillers and/or reinforcing materials, lubricants and release agents, pigments and/or dyes, other additives, e.g., stabilizers, flexibilizers, curing retarders and non-reactive resins.

The fillers usually used are chalk ($CaCO_3$), ATH, powdered quartz, rock flour, wollastonite, mica, and the reinforcing materials usually used are glass fibres, synthetic organic substances (e.g., synthetic fibres, polyesters, polyamides, aramids), carbon fibres (C fibres); naturally occurring organic substances (e.g., wood flour and cellulose).

Details of the processing of these moulding compounds are given in Polymere Werkstoffe—Band III, Technologie 2 [Polymeric materials, Volume III, Technology 2], by Hans Batzer, Georg Thieme Verlag, Stuttgart, 1984 edition, pp. 224 et seq.

Examples of thermoset compositions are UP moulding compositions, in particular fibre-reinforced moulding compounds, as described in Polymere Werkstoffe—Band III, Technologie 2 [Polymeric materials, Volume III, Technology 2], by Hans Batzer, Georg Thieme Verlag, Stuttgart, 1984 edition, pp. 235 et seq. These fibre-reinforced moulding compounds are often found in sheet form (also termed Sheet Moulding Compounds or SMC) further divide into the groups LS (Low Shrink) and LP (Low Profile). LP systems are compounds that give substantial compensation of shrinkage. LS systems do not achieve the shrinkage compensation of LP resins but are substantially easier to colour. If SMC mouldings are intended for downstream surface-coating, e.g., in the case of bodywork components, preference is given to LP systems.

EXAMPLES

The examples below illustrate the invention without restrictive effect:

Abbreviations, Trade Names and/or chemical composition

PVC: a polyvinylchloride resin

CPVC: chlorinated polyvinylchloride resin

S-PVC1: S-PVC INOVYN 264 PC supplied by Inovyn; a polyvinylchloride resin prepared by suspension polymerization DOTP-GPO: DOTP Oxsoft GPO supplied by Oxea GmbH; a plasticizer having the formula: bis(2-ethylhexyl)-1,4-benzenedicarboxylate.

STA1: Ca/Zn stabilizer Mark CZ 2000 supplied by Galata Chemicals; a Ca/Zn metal soap stabilizer STA2: Ca/Zn stabilizer Mark CZ 2060 supplied by Galata Chemicals; a Ca/Zn metal soap stabilizer CA-OG: Omya Millicarb OG supplied by Omya; a calcium carbonate powder CA-D40: Durcal 40 supplied by Omya; a calcium carbonate powder MMA-BA1: an acrylic or methacrylic copolymer having a glas transition point (Tg) of about 87° C.

MMA-BA2: a butyl acrylate-methyl methacrylate copolymer having a glas transition point (Tg) of about 122° C.

AC-FA: chemical composition: a polar acidic ester of fatty alcohols (long chain alcohols), which has an acid value of 85 mg KOH/g PPO-DFA: chemical composition: a butyl started PPO, which is capped with a dimer fatty acid and which has an acid value of 14 mg KOH/g PPG 2000: polypropylene glycol, number average molecular weight (Mn): 2000

PPG 600: polypropylene glycol, number average molecular weight (Mn): 600

DowfaxDF123Glycerol started polypropylene oxide polyether having a number average molecular weight (Mn) of 3000 g/mol Formation of the polymer (dispersing agent) according to the present invention:

Example A

Reaction of Polypropylene Glycol and Maleic Acid Anhydride

A 4-necked reaction vessel with stirrer, thermometer, reflux cooler and nitrogen inlet tube is charged at room temperature with 2000 g (1 mol) of polypropylene glycol polyether (PPG 2000 having a Mn of 2000 g/mol and D of <1.1) and 6.6 g (0.3 wt %) of KOH. The mixture was stirred at 100° C. under vacuum for 2 h. After cooling to 80° C. 147 g (1.5 mol) of maleic anhydride was added and the mixture was stirred for additional 3 h at 80° C. The progress of the reaction was monitored by determining anhydride value. The reaction is continued until anhydride value of 0.0 has been achieved. The mixture is then cooled and discharged. After the reaction has been ended, a product is formed mainly consisting of polypropylene glycol having one or two carboxylic acid end groups and having one or none hydroxyl end groups. The resulting polypropylene glycol polyether has on average 1.5 carboxylic acid end groups per molecule (which is equal to about 75 mol-% of the end groups of the polymer). The polypropylene glycol has on average 0.5 hydroxyl end groups per molecule (which is equal to about 25 mol-% of the end groups of the polymer).

GPC indicated that the Dispersity D and the Mn of the resulting polypropylene glycol polyether is substantially equal to the dispersity D and the Mn of the precursor polyether PPG 2000.

Example B

Reaction of Polytetrahydrofuran Polyether and Maleic Acid Anhydride

The reaction of 2000 g (1 mol) polytetrahydrofuran polyether (polyTHF 2000 having a Mn of 2000 g/mol supplied by Overlack GmbH) and 147 g (1.5 mol) maleic anhydride was performed in a similar way as described for EXAMPLE A. The polytetrahydrofuran polyether (polyTHF 2000) has two hydroxyl end groups.

After the reaction has been ended, a product is formed mainly consisting of polytetrahydrofuran polyether having one or two carboxylic acid end groups and having one or none hydroxyl end groups. The modified polytetrahydrofuran polyether has on average 1.5 carboxylic acid end groups per molecule (which is equal to about 75 mol-% of the end groups of the polymer). The modified polytetrahydrofuran polyether has on average 0.5 hydroxyl end groups per molecule (which is equal to about 25 mol-% of the end groups of the polymer). GPC indicated that the Dispersity D and the Mn of the resulting substituted poly tetrahydrofuran polyether is substantially equal to the dispersity D and the Mn of the precursor poly tetrahydrofuran 2000.

Example C

Reaction of Polypropylene Glycol and Phosphorous Pentoxide

In a flask as described above, 1 mol of polypropylene glycol having a Mn of 2000 g/mol and 1 mol of $P_2O_5$ were mixed and stirred under nitrogen for 1 hour at 60° C. The temperature was raised to 85° C. to 90° C. and held for further 23 hours. The mixture was then cooled and discharged Example D Reaction of Polypropylene Glycol and Phosphorous Pentoxide In a flask as described above, 1 mol of polypropylene glycol having a Mn of 2000 g/mol and 0.5 mol of $P_2O_5$ were mixed and stirred under nitrogen for 1 hour at 60° C. The temperature was raised to 85° C. to 90° C. and held for further 23 hours. The mixture was then cooled and discharged Example E A 4-necked reaction vessel with stirrer, thermometer, reflux cooler and nitrogen inlet tube is charged at room temperature with 1 mol of DowfaxDF123 and 6.6 g of KOH. The mixture was stirred at 100° C. under vacuum for 2 h. After cooling to 80° C. 1.0 mol of maleic anhydride was added and the mixture was stirred for additional 3 h at 80° C. The progress of the reaction was monitored by determining anhydride value. The reaction is continued until anhydride value of 0.0 has been achieved. The mixture is then cooled and discharged.

Examples F to J were prepared according to Example E, but instead of 1.0 mol of maleic anhydride the following amounts were used:

TABLE 0-a

Amounts of maleic anhydride used for synthesis of Examples F to J

| Example | Amount of maleic anhydride [mol] |
|---|---|
| F | 1.5 |
| G | 1.75 |
| H | 2 |
| I | 2.3 |
| J | 2.5 |

Formation of PVC Blends:
Production of PVC-Dryblend

Utilize a Vorwerk Thermomix TM 31 to prepare the PVC dryblend. The amount of compound used in this equipment is 600 grams. Weigh all raw materials into the mixing cup except the plasticizer. Mix the compound at speed level "7". After 5 minutes of mixing time, add the plasticizer at a slow mixing speed (level 4). Mix the plasticized compound at level "7" to a mass temperature of 100° C. Place the PVC dryblend on paper for cooling.

Table I-a shows the recipes of the PVC compositions having a inorganic solid particles CA-OG.

TABLE I-a

PVC compositions with inorganic solid particles Millicarb OG

| | Examples | | | | | | |
|---|---|---|---|---|---|---|---|
| | 1* [mass parts] | 2* [mass parts] | 3* [mass parts] | 4* [mass parts] | 5* [mass parts] | 6* [mass parts] | 7 [mass parts] |
| S-PVC 1 | 100 | 100 | 100 | 100 | 100 | 100 | 100 |
| DOTP-GPO | 20 | 20 | 20 | 20 | 20 | 20 | 20 |
| STA1 | 2.0 | 2.0 | 2.0 | 2.0 | 2.0 | 2.0 | 2.0 |
| CA-OG | 100 | 150 | 200 | 200 | 200 | 200 | 200 |
| MMA-BA1 | | | | 4.0 | | | |
| AC-FA | | | | | 4.0 | | |
| PPO-DFA | | | | | | 4.0 | |
| Example A | | | | | | | 4.0 |
| Additive [weight-%] on weight of inorganic solid particles | — | — | — | 2.0% | 2.0% | 2.0% | 2.0% |
| Inorganic solid particles [weight-%] on weight of composition | 45% | 55% | 62% | 61% | 61% | 61% | 61% |

The examples marked with "*" are not part of the invention, but are used as comparison examples.

The inorganic solid particles CA-OG (Millicarb OG supplied by Omya) is a calcium carbonate powder having a medium value of particle size distribution of 2.7 μm (D50%). The inorganic solid particles CA-OG has a sieve residue level of 0.01% at 45 μm according to test method ISO 787/7.

As the inorganic solid particles has a relatively small mean particle size, it is expected that a processing behavior of the PVC blend, such as plastification time and fusion time, is reduced in a inorganic solid particles loading range between 100 and 200 mass parts in respect to 100 mass parts of the PVC resin.

In case a filler is used having a larger mean particle size, an effect on processing behavior of the inorganic solid particles loading may be observed above a inorganic solid particles loading point (expressed in [weight %], wherein the % by weight are calculated on the total weight of the composition), which is higher than a reference minimum inorganic solid particles loading observed in these experiments.

Additionally, when a different amount of plasticizer is used or when another type of plasticizer is used, a processing behavior of the filled PVC may be different. A higher amount of plasticizer may enhance the processing behavior of the PVC blend, however at the cost of reduced mechanical properties of the resulting PVC blend (such as a lower tensile strength).

Tables I-b and I-b-1 show the recipes of the PVC compositions having a inorganic solid particles Durcal 40.

TABLE I-b

PVC compositions with inorganic solid particles Durcal 40

| | Examples | | | | | | |
|---|---|---|---|---|---|---|---|
| | 8* [mass parts] | 9* [mass parts] | 10% [mass parts] | 11 [mass parts] | 12 [mass parts] | 15* [mass parts] | 16* [mass parts] |
| S-PVC 1 | 100 | 100 | 100 | 100 | 100 | 100 | 100 |
| DOTP-GPO | 30 | 30 | 30 | 30 | 30 | 30 | 30 |
| PPO-DFA | 0.3 | 0.3 | 0.3 | 0.3 | 0.3 | 0.3 | 0.3 |
| STA2 | 2.5 | 2.5 | 2.5 | 2.5 | 2.5 | 2.5 | 2.5 |
| CA-D40 | 200 | 200 | 200 | 200 | 200 | 200 | 200 |
| MMA-BA2 | | 2.0 | | | | | |
| AC-FA | | | 2.0 | | | | |
| Example A | | | | 2.0 | | | |
| Example B | | | | | 2.0 | | |
| Example C | | | | | | 2.0 | |
| Example D | | | | | | | 2.0 |
| Additive [weight-%] on weight of inorganic solid particles | — | 1.0% | 1.0% | 1.0% | 1.0% | 1.0% | 1.0% |
| Inorganic solid particles [weight-%] on weight of composition | 60% | 60% | 60% | 60% | 60% | 60% | 60% |

The examples marked with "*" are not part of the invention, but are used as comparison examples.

TABLE I-b

PVC compositions with inorganic solid particles Durcal 40

| | Examples | | | | | | |
|---|---|---|---|---|---|---|---|
| | 17* [mass parts] | 18 [mass parts] | 19 [mass parts] | 20 [mass parts] | 21 [mass parts] | 22 [mass parts] | 23 [mass parts] |
| S-PVC 1 | 100 | 100 | 100 | 100 | 100 | 100 | 100 |
| DOTP-GPO | 30 | 30 | 30 | 30 | 30 | 30 | 30 |
| PPO-DFA | 0.3 | 0.3 | 0.3 | 0.3 | 0.3 | 0.3 | 0.3 |
| STA2 | 2.5 | 2.5 | 2.5 | 2.5 | 2.5 | 2.5 | 2.5 |
| CA-D40 | 300 | 300 | 300 | 300 | 300 | 300 | 300 |
| Example E | | 1.5 | | | | | |
| Example F | | | 1.5 | | | | |
| Example G | | | | 1.5 | | | |
| Example H | | | | | 1.5 | | |
| Example I | | | | | | 1.5 | |
| Example J | | | | | | | 1.5 |
| Additive [weight-%] on weight of inorganic solid particles | — | 0.5% | 0.5% | 0.5% | 0.5% | 0.5% | 0.5% |
| Inorganic solid particles [weight-%] on weight of composition | 69% | 69% | 69% | 69% | 69% | 69% | 69% |

The examples marked with "*" are not part of the invention, but are used as comparison examples.

The inorganic solid particles CA-D40 (Durcal 40 supplied by Omya) is a calcium carbonate powder having a medium value of particle size distribution of 30 μm (D50%).

Formation of Masterbatch Compositions

Several masterbatch compositions were made prepared from Durcal 40 inorganic solid particles and EXAMPLE A as additive (see Table I-c). The masterbatch compositions (Example 13M and 14M) were prepared by mixing the Durcal 40 inorganic solid particles and EXAMPLE A in a mixing device Thermomix TM 31 (at Level 6 for 20 minutes). After mixing, the Durcal 40 inorganic solid particles has adsorbed the additive of EXAMPLE A (presumably onto the surface of the inorganic solid particles).

Table I-c shows the recipes of the masterbatch compositions having inorganic solid particles Durcal 40.

TABLE I-c masterbatch compositions with inorganic solid particles Durcal 40

| Examples Masterbatch | 13M [mass parts] | 14M [mass parts] |
|---|---|---|
| CA-D40 | 200.0 | 200.0 |
| Example A | 2.0 | 3.0 |
| Additive [weight-%] on weight of inorganic solid particles | 1.0% | 1.5% |

The masterbatch compositions of dry inorganic solid particles, which is coated with additive of Example A, were further processed to prepare a PVC blend according to the examples 13-14 utilizing a Vorwerk Thermomix TM 31 to prepare the PVC dryblend. The compositions of these recipes is shown in Table I-d.

TABLE I-d

PVC compositions made with masterbatch compositions with filler Durcal 40

| Examples | 13 | 14 |
|---|---|---|
| Masterbatch type | 13M | 14M |
| PVC-blend | [mass parts] | [mass parts] |
| Masterbatch | 202.0 | 203.0 |
| S-PVC 1 | 100 | 100 |
| DOTP-GPO | 30 | 30 |
| PPO-DFA | 0.3 | 0.3 |
| STA2 | 2.5 | 2.5 |

TABLE I-d-continued

PVC compositions made with masterbatch compositions with filler Durcal 40

| Examples | 13 | 14 |
|---|---|---|
| Masterbatch type | 13M | 14M |
| PVC-blend | [mass parts] | [mass parts] |
| Additive [weight-%] on weight of inorganic solid particles | 1.0% | 1.5% |
| Inorganic solid particles [weight-%] on weight of composition | 60% | 60% |

The masterbatch compositions were prepared and further processed to prepare PVC blends in order to test the effects of the masterbatch compositions on the final PVC blends.

Evaluate the Processing of the Compound on a Heated Two-Roll Lab Calendar

The processing of the compound was tested on a heated two-roll lab calendar—Collin W 150P. The calendar rolls were heated up to a set temperature in the range 165° C.-185° C. 250 grams of prepared PVC dryblend were placed between the heated calendaring rolls, which were running at a speed of 5 rpms, at a gap of 0.2 mm. The final temperature setting of the calendaring rolls depends on the formulation (PVC resin K-value; plasticizer content; inorganic solid particles amount). After 10 seconds the front calendaring roll speed was increased to 18 RPM and the back roll to 15 RPM. The gap was opened up to 0.5 mm (or a different gap when indicated). The melting speed was visually checked and the distribution of melt in the gap. Fast melting and good distribution of the PVC dry blend were indications for good processing properties. The adhesion and the heat stability of the PVC dry blend to the calendaring rollers were observed.

If the compound showed sticking to the calendaring rolls or poor color, the release of the dryblend was determined as poor.

If formation of a mat layer was observed on the surface of the calendaring rolls, this may lead to a sticking behavior of the compound to the calendaring rolls. A mat layer formation on the surface of the calendaring rolls is labelled as "plate-out". A mat layer on the calendaring rolls is usually caused by a migration of one or more additives from the compound onto the calendaring rolls.

The melted material was worked back into the calendaring gap every 30 seconds. The PVC sheet was removed from the calendar after 4 minutes and placed on a flat plate for cooling.

Test of Plastification Behavior with Brabender Plasti-Corder, Kneader W50EHT

Speed: select speed in range 50 RPM-70 RPM
Temperature setting: select temperature in range 150-170° C.
Test time: 6 min.
Automatic filling system: by plunger (2 bar)
Measurement: at constant chamber volume The PVC dryblend was filled from above into the heated kneader device. The compound was homogenized using specially shaped kneading blades, Depending on inorganic solid particles amount and bulk density of the PVC dryblend, the amount of the PVC compound was adjusted to ensure constant chamber volume. The Plasti-Corder was recording the torque (indicating melt viscosity), fusion time, and temperature. The corresponding diagram showed the relationship between the torque (which indicates melt viscosity) and the temperature, as a function of time.

Test of Physical Properties with ZWICK Zmart.Pro in Accordance with DIN EN ISO 527-3 (Modified Measurement)

A Zwick punch was used to prepare the sample for testing. Sample size:
Length (total): 152 mm
Clamping length: 116 mm
Width at ends: 25 mm
Width in middle: 13 mm
Measurement conditions of the Zwick zmart.pro:
Load cell: 1 kN
Initial load: 0.1 MPa
Testing Speed: 200 mm/min
Test for: Tensile Strength, Elongation at Break
Test Results Two-Roll Lab Calendar Table II-a shows the processing properties of examples 1-7 (with inorganic solid particles Millicarb OG) on the two-roll lab calendar at temperature 185° C.

TABLE II-a processing properties on two-roll lab calendar of examples with inorganic solid particles Millicarb OG

| Examples | plate-out | release properties | Plastification | Self-rotation |
|---|---|---|---|---|
| 1* | no | good | fast | good |
| 2* | no | good | slower than #1 | bad |
| 3* | lightly | good | slow | no |
| 4* | no | good | very slow | no |
| 5* | no | good | slower than #1 | bad |
| 6* | no | good | reasonable | good |
| 7 | no | good | fast | good |

Notes to the test results of the two-roll lab calendar at temperature 185° C.:

Example 1 showed good self-rotation of melt in gap and good melt strength. Example 2 showed slower plastification than Example 1, partly ripple from rolls, and bad self-rotation of melt in gap. Example 3 showed clearly slower plastification than Example 1, more ripple from rolls than Example 2, and no self-rotation of melt in gap.

It is clear from the Examples 1-3, that the processing behavior of the melt on the two-roll lab calender becomes worse, when increasing the inorganic solid particles level from 100 phr (Example 1) to 200 phr (Example 3).

Example 4 showed that the PVC blend material falls almost completely from the calendar rolls, very slow plastification, and no self-rotation of melt in gap. Thus, the acrylic-methacrylic copolymer (MMA-BA1) did not improve the processing behavior of the PVC blend.

Example 5 showed a similar behavior as Example 2. Thus, the acidic ester of fatty alcohols (AC-FA) only slightly improved the processing behavior of the PVC blend. However, not enough for a proper mixing of the components in the blend.

Example 6 showed a slightly ripple from rolls, and a good self-rotation of melt in gap. Thus, the dimer fatty acid condensation product of propylene glycol provides enhanced processing of the PVC blend. However, the plastification time was large in order to properly mix the PVC blend (as can also be observed from the results shown in Table III-a).

Example 7 showed a fast plastification and a clearly improved self-rotation of melt in the gap compared with the Examples 3-6. Thus, the additive according to the invention improved the processing behavior of the PVC blend. This can also be observed from the results shown in Table III-a).

Table II-b shows the processing properties of examples 8-12 (with inorganic solid particles Durcal 40) on the two-roll lab calendar at temperature 165° C.

TABLE II-b processing properties on two-roll lab calendar of examples with inorganic solid particles Durcal 40

| Examples | plate-out | release properties | Plastification | Self-rotation in gap [mm] |
|---|---|---|---|---|
| 8* | no | good | good | 0.5 |
| 9* | no | good | slower | 0.6 |
| 10* | no | good | slower | 0.6 |
| 11 | no | good | faster | 0.4 |
| 12 | yes | slightly sticky | good | 0.7 |
| 15* | yes | good | slower | 0.7 |
| 16* | no | good | slower | 0.6 |

Notes to the test results of the two-roll lab calendar at temperature 165° C.:

Example 8 showed good plastification speed of melt in gap and sufficient melt strength.

Example 8 is the reference for Examples 9-12 and 15-16.

Example 9 showed slower plastification than Example 8, and an increased melt strength compared to Example 8. Example 10 showed slower plastification than Example 8, and melt strength similar to Example 8.

Example 11 (which contains additive of EXAMPLE A) showed clearly faster plastification than Example 8. The melt strength is similar to Example 8.

Example 12 (which contains additive of EXAMPLE B) showed good plastification speed and an increased melt strength compared to Example 8.

Examples 15 showed plate out and, as well as Example 16, a slower plastification speed than Example 8.

The attainable gap for proper self-rotation of the melt of the Examples is indicated in Table II-b. The reference is Example 8 having a gap of 0.5 mm. The attainable gap for proper self-rotation of the melt of Example 9, 10 and 12 is larger. The attainable gap for proper self-rotation of the melt of Example 11 is smaller.

Thus, the additive according to the invention (Example A and Example B) improves the processing behavior (especially the plastification behavior) of the PVC blend. This can also be observed from the results shown in Table III-b.

Test Results Plastification Behavior with Brabender Plasti-Corder

TABLE III-a

Plastification Behavior on Brabender Plasti-Corder with inorganic solid particles Millicarb OG

| | Examples | | | | | | |
|---|---|---|---|---|---|---|---|
| | 1* | 2* | 3* | 4* | 5* | 6* | 7 |
| Fusion time [sec] | 54 | 92 | 238 | n.a. | 78 | 96 | 58 |
| Torque at End [Nm] | 22.8 | 23.2 | 27.1 | | 22.4 | 20.8 | 20.4 |

The examples marked with "*" are not part of the invention, but are used as comparison examples.

The plastification behavior on the Brabender Plasti-Corder was tested at conditions 170° C., 50 rpm during 6 minutes.

The plastification behavior on the Brabender Plasti-Corder showed that the fusion time increased from 54 to 238 [sec] when increasing the inorganic solid particles level from 100 phr to 200 phr (Examples 1-3).

The fusion time and the Torque of the blend of Example 4 could not be determined as the material did not plasticize during the test in the Brabender Plasti-Corder.

Example 5 showed a reasonable good fusion time (in between the fusion time of Examples 1 and 2). Example 6 showed a slower fusion time, which is similar to the fusion time of Example 2. Example 7 showed a fast fusion time, which is similar to the fusion time of Example 1.

Thus, the additive according to the present invention clearly enhances the fusion time up to the level of Example 1.

TABLE III-b

Plastification Behavior on Brabender Plasti-Corder with inorganic solid particles Durcal 40

| | Examples | | | | | | |
|---|---|---|---|---|---|---|---|
| | 8* | 9* | 10* | 11 | 12 | 15* | 16* |
| Fusion time [sec] | 50 | 52 | 86 | 30 | 26 | 58 | 84 |
| Torque at End [Nm] | 23.7 | 24.5 | 23.0 | 22.1 | 24.1 | 27.4 | 25.9 |

The examples marked with "*" are not part of the invention, but are used as comparison examples.

The plastification behavior on the Brabender Plasti-Corder was tested at conditions 150° C., 70 rpm during 6 minutes. The plastification behavior of Example 8 showed that the fusion time is 50 [sec].

Example 9* showed a fusion time of 52 [sec], which is not different from Example 8*. Example 10* showed a slow fusion time of 86 [sec], which is slower than Example 8*. Example 11 and Example 12 both showed a fast fusion time (i.e. 30 [sec] and 26 [sec] respectively), which is faster than Example 8*. Examples 15 and 16 both showed a fusion time that is slower than Example 8*.

Thus, the polymer additive according to the present invention (Example A and Example B) clearly enhances the fusion time up to a level faster than of Example 8*.

Table III-c compares the plastification behavior of the Examples 8*, 11 and 13 and 14 on the Brabender Plasti-Corder.

TABLE III-c

Plastification Behavior on Brabender Plasti-Corder with inorganic solid particles Durcal 40

| | Examples | | | |
|---|---|---|---|---|
| | 8* | 11 | 13 | 14 |
| Fusion time [sec] | 50 | 30 | 31 | 27 |
| Torque at End [Nm] | 23.7 | 22.1 | 22.2 | 21.3 |

The example 8 marked with "*" is not part of the invention, but is used as comparison examples.

The plastification behavior on the Brabender Plasti-Corder was tested at conditions 150° C., 70 rpm during 6 minutes.

Example 11 is a mixed PVC blend with additive Example A. Example 13 and 14 are PVC blends made from pre-mixed masterbatches compositions of inorganic solid particles with additive Example A.

Example 13 and Example 11 both have 1.0% polymer additive (Example A) by weight, wherein the % by weight is calculated on the weight of the inorganic solid particles. The fusion time of Example 13 is much lower than the fusion time of Example 8* and is similar to the fusion time of Example 11. The Torque at End of Example 13 is similar to the Torque at End of Example 11. This shows that the masterbatch composition provides the same improvement of the fusion time compared to the reference Example 8*, which is without additive Example A.

Example 14 has 1.5% polymer additive (Example A) by weight, wherein the % by weight is calculated on the weight of the inorganic solid particles. The fusion time of Example 14 is slightly lower than the fusion time of Example 11 and Example 13. The Torque at End of Example 13 is slightly lower than the Torque at End of Example 11 and Example 13.

TABLE III-d

Plastification Behavior on Brabender Plasti-Corder with inorganic solid particles Durcal 40

| | Examples | | | | | |
|---|---|---|---|---|---|---|
| | 17* | 18 | 19 | 20 | 21 | 22 | 23 |
| Fusion time [sec] | 86 | 78 | 50 | 46 | 44 | 44 | 56 |
| Torque at End [Nm] | 31.2 | 24.4 | 26.6 | 26.2 | 27.0 | 27.0 | 27.6 |

The example 17 marked with "*" is not part of the invention. but is used as comparison examples.

The plastification behavior on the Brabender Plasti-Corder was tested at conditions 150° C., 70 rpm during 6 minutes.

All of the examples according to the invention showed a reduced fusion time and a reduction in torque at end in comparison to the non-inventive comparison example 17*. Thus, the additive according to the present invention clearly enhances the processing behavior.

Test Results Physical Properties

TABLE IV-a

Tensile properties of PVC blends with inorganic solid particles Millicarb OG

| | Examples | | | | | | |
|---|---|---|---|---|---|---|---|
| | 1* | 2* | 3* | 4* | 5* | 6* | 7 |
| δM Tensile Strength in MPa | 21.3 | 16.8 | 15.5 | 16.5 | 15.6 | 14.5 | 13.9 |
| εB Elongation at break in % | 31.0 | 9.6 | 2.6 | 5.6 | 2.1 | 4.1 | 16.0 |

The Tensile strength decreases for inorganic solid particles Millicarb OG when increasing the inorganic solid particles level from 100 phr to 200 phr (Examples 1-3). The elongation at break decreases strongly when increasing the inorganic solid particles level from 100 phr to 200 phr (Examples 1-3).

Example 4 showed substantially no change of the Tensile strength and only a slight improvement of elongation at break compared with Example 3.

Example 5 showed substantially no change of the Tensile strength and the elongation at break compared with Example 3.

Example 6 showed substantially no change of the Tensile strength and only a slight improvement of elongation at break compared with Example 3.

Example 7 showed only a slight decrease of the Tensile strength and a strong improvement of elongation at break compared with Example 3. The elongation at break improved to a level better than for Example 2. Thus, the additive according to the present invention clearly enhances the elongation at break to a level between Example 1 (100 phr inorganic solid particles) and Example 2 (150 phr inorganic solid particles).

Table IV-b compares the Tensile properties of PVC blends with inorganic solid particles Durcal 40

TABLE IV-b

Tensile properties of PVC blends with inorganic solid particles Durcal 40

| | Examples | | | | | | |
|---|---|---|---|---|---|---|---|
| | 8* | 9* | 10* | 11 | 12 | 15* | 16* |
| δM Tensile Strength in MPa | 6.6 | 7.4 | 7.0 | 6.2 | 7.0 | 7.5 | 7.2 |
| εB Elongation at break in % | 22.0 | 27.0 | 33.0 | 34.0 | 34.0 | 26.0 | 25.0 |

The Tensile Strength is much lower than Examples 1-7 due to a bigger particle size of the inorganic solid particles Durcal 40 compared to inorganic solid particles Millicarb OG. The tensile strength is more or less independent of additives.

All additives compared to Example 8 improve the elongation at break. The examples 11 and 12 show that the elongation at break is further improved compared to Example 8*.

Table IV-c compares the εB Elongation at break of PVC blends with inorganic solid particles Durcal 40

TABLE IV-c

Tensile properties of PVC blends with inorganic solid particles Durcal 40

| | Examples | | | | | | |
|---|---|---|---|---|---|---|---|
| | 17* | 18 | 19 | 20 | 21 | 22 | 23 |
| εB Elongation at break in % | 13 | 22 | 28 | 25 | 24 | 28 | 25 |

The table shows an improvement in εB Elongation at break, when comparing the examples according to the invention to the non-inventive comparison example 17*. Therefore, the test results show a clear improvement of the physical properties of the inventive examples.

The invention claimed is:

1. A composition comprising
   a) polyvinylchloride,
   b) inorganic solid particles, and
   c) a polymer comprising a polyether segment, wherein at least 60 mol-% of end groups of the polymer include any one or more of a carboxylic acid group and a hydroxyl group, and at least a part of the end groups includes a carboxylic acid group, linked to the polyether segment via a linking segment comprising an ester group.

2. The composition according to claim 1, wherein the polymer comprises on average at least 1.0 carboxylic acid end groups per molecule.

3. The composition according to claim 1, wherein the linking segment comprises a hydrocarbyl group located between the ester group and the carboxylic acid group, wherein the ester group and the carboxylic acid group are separated by at most 6 carbon atoms.

4. The composition according to claim 1, wherein the polyether segment comprises polyalkylene oxide units.

5. The composition according to claim 1, wherein the polyether segment comprises repeating units of the formula —[O—$(CH_2)_4$]—.

6. The composition according to claim 1, wherein the polymer has 2 to 6 end groups.

7. The composition according to claim 1, wherein the polymer has a number average molecular weight Mn in the range of 1000 to 5000 g/mol.

8. The composition according to claim 1, wherein the composition comprises the inorganic solid particles in an amount in the range of 20 to % by weight, calculated on the weight of the composition.

9. The composition according to claim 1, further comprising a plasticizer.

10. The composition according to claim 1, further comprising an acrylic copolymer comprising a methyl methacrylate unit and at least one other acrylic monomer.

11. The composition according to claim 1, comprising
a) 7 to 60% by weight of the polyvinylchloride,
b) 20 to 90% by weight of the inorganic solid particles, and
c) 0.1 to 5.0% by weight of the polymer,
d) 0 to 30% by weight one or more plasticizers, and
e) 0 to 5% by weight of other additives which are different from components a) to d),
wherein the % by weight are calculated on the total weight of the composition.

12. A process of preparing a filled polyvinyl chloride material, the process comprising:
forming a mixture by mixing, in any suitable order, components comprising:
polyvinylchloride,
inorganic solid particles,
a polymer comprising a polyether segment, wherein at least 60 mol-% of end groups of the polymer include any one or more of a carboxylic acid group and a hydroxyl group, and at least a part of the end groups includes a carboxylic acid group linked to the polyether segment via a linking segment comprising an ester group, and
optionally further components, and
subjecting the mixture to shear force in a temperature range of 80 to 200° C.

13. A composition comprising inorganic solid particles and a polymer having a polyether segment, wherein at least 60 mol-% of end groups of the polymer include any one or more of a carboxylic acid group and a hydroxyl group, at least a part of the end groups includes a carboxylic acid group linked to the polyether segment via a linking segment comprising an ester group, and the composition comprises the polymer in an amount of 0.1% to 5.0% by weight calculated on the weight of the inorganic solid particles.

14. A floor tile comprising the composition according to claim 1.

15. A method of improving mechanical properties of a composition, the method comprising:
adding a polymer to a composition comprising polyvinylchloride and inorganic solid particles, the polymer comprising a polyether segment, wherein at least 60 mol-% of end groups of the polymer include any one or more of a carboxylic acid group and a hydroxyl group, at least a part of the end groups includes a carboxylic acid group linked to the polyether segment via a linking segment comprising an ester group.

* * * * *